Oct. 7, 1969     G. BJORNSON     3,471,546
PLASMA JET CONVERSION OF FLUOROFORM
Filed Sept. 28, 1966
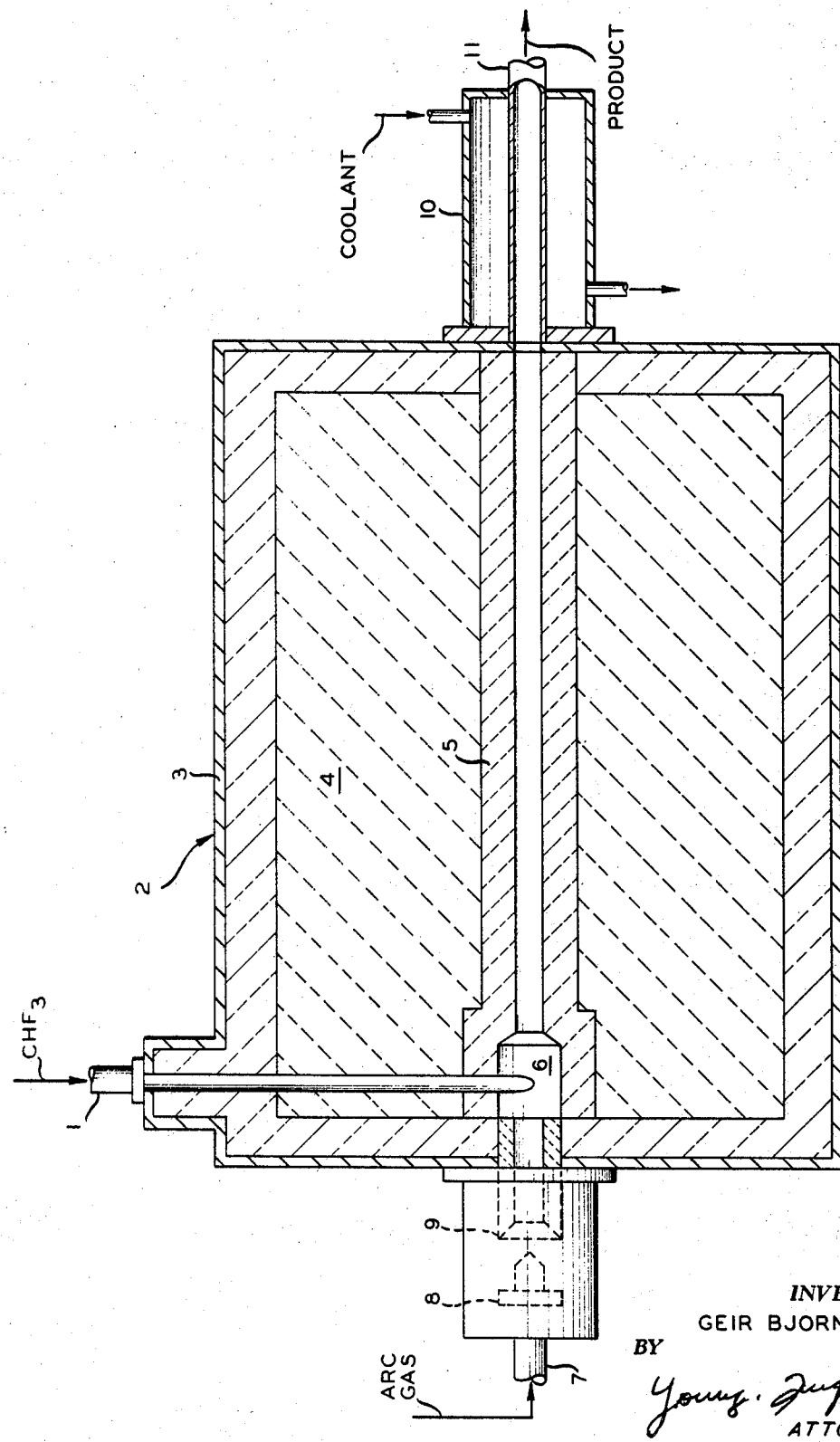
INVENTOR
GEIR BJORNSON
BY
*ATTORNEYS*

United States Patent Office 3,471,546
Patented Oct. 7, 1969

3,471,546
PLASMA JET CONVERSION OF FLUOROFORM
Geir Bjornson, Bartlesville, Okla., assignor to Phillips Petroleum Company, a corporation of Delaware
Filed Sept. 28, 1966, Ser. No. 582,728
Int. Cl. C07c *121/02, 17/24, 17/26*
U.S. Cl. 260—465.7     3 Claims

ABSTRACT OF THE DISCLOSURE

Pyrolysis of fluoroform by contacting the same with a plasma jet to produce a reaction effluent to produce trifluoroacetonitrile, tetrafluoromethane, hexafluoroethane, tetrafluoroethane, and hexafluoropropene is disclosed. When nitrogen is present in the formation of the plasma jet trifluoroacetonitrile is among the products formed.

---

This invention relates to the conversion of fluoroform by contacting the same with a plasma jet, for example, a plasma of nitrogen. In one of its aspects, the invention relates to contacting fluoroform with a palsma of say nitrogen gas at a temperature at which fluoroform is pyrolyzed. In another of its aspects, the invention relates to the production of trifluoroacetonitrile and other materials by contacting fluoroform with a hot plasma.

In one of its concepts, the invention provides a process for the conversion of fluoroform (trifluoromethane) by contacting the same with a hot plasma, e.g., a plasma of nitrogen. In another of its concepts, the invention provides a process for the production of trifluoroacetonitrile, tetrafluoromethane, hexafluoroethane, tetrafluoroethene, hexafluoropropene and other fluoroolefins as well as saturated compounds depending upon the conditions of the operation.

It is known to produce trifluoroacetonitrile by fluorinating a chlorinated acetonitrile, U.S. Patent 2,745,867, patented May 15, 1956. It is also known to produce trifluoroacetonitrile by contacting cyanogen chloride and a difluoromethane, U.S. Patent 2,939,878, issure June 7, 1960. Further, it is known to pyrolyze fluoroform by passing the same through a hot tube thus producing fluorocarbons, U.S. Patent 3,009,966, issued Nov. 21, 1961.

I have now discovered that trifluoroacetonitrile is produced in good yield when fluoroform is contacted with a palsma of nitrogen. The yields are very advantageously compared with those obtained by relatively inefficient and more costly processes now known in the art.

I have also discovered that, depending upon the particular conditions involved, there are also produced valuable by-products. By-products which are produced include tetrafluoromethane, tetrafluoroethene, hexafluoroethane and hexafluoropropene.

Trifluoroacetonitrile, the product of this invention, is a valuable and useful compound. For instance, it is a superior dielectric medium for high voltage transformers. The by-products, tetrafluoroethene and hexafluoropropene, are also valuable as precursors to fluorocarbon polymers.

It is an object of this invention to provide a process for the conversion of fluoroform. It is another object of this invention to provide a process for the production of trifluoroacetonitrile. It is another object of this invention to provide a process for the production of compounds such as tetrafluoromethane, tetrafluoroethene, hexafluoroethane, hexafluoropropene, etc. It is still another object of this invention to provide a process with which trifluoroacetonitrile and certain other products can be produced in a relatively efficient and much cheaper manner.

Other concepts, objects and the several advantages of this invention are apparent from a study of this document.

According to the present invention, there is provided a process for the conversion of fluoroform, which comprises contacting the same with a plasma, e.g., a nitrogen plasma.

Fluoroform is readily available from commercial sources or can be readily synthesized by conventional methods.

According to the invention, any conventional plasma reactor now known in the art can be used or readily adapted for use in the invention. Also, a reactor such as described in my copending application S.N. 449,145, filed Apr. 19, 1965, can be used. The reactor described in the drawing is preferred as a particularly suitable reactor for the process of the present invention.

Generally, the reactor is so designed and operated that fluoroform is contacted with the palsma at temperatures between 1000 and 20,000° F. for a contact time of the order of 0.0001 to 10 seconds. The methods for such contacting times are known in the art. For example, a continuous process, wherein fluoroform and nitrogen gas are passed through an electric arc to a reaction chamber and then to a quench chamber at high velocity, is a now preferred form of the invention. In a still more preferred form of the process, the charge of fluoroform into the plasma is downstream from the arc. Subatmospheric and superatmospheric pressures can be employed. However, atmospheric pressure is ordinarily preferred because of ease of operation.

The product, as well as the by-products of the invention, can be readily recovered by conventional techniques, fractional distillation, solvent extraction, chromatography, etc.

Referring now to the drawing, fluoroform is tangentially introduced at 1 into a reactor 2 fabricated of steel 3, zirconia 4, and carbon 5 wherein it is contacted in a reaction zone 6 with nitrogen plasma produced by passing nitrogen through pipe 7 and through an arc struck between the cathode 8 and anode 9 to the reaction zone 6. The reacting mass travels a distance at a velocity such that the desired contact time is provided and is passed to a water cooled condenser 10 wherein cooling is effected. The products then pass through pipe 11 to a heat exchanger, a water bath, a water bubbler, and on to a recovery system. Samples of products are collected through a filter and a calcium sulfate drier from the stream at a point downstream from the bubbler but upstream of the recovery system. The heat exchanger, water bath, water bubbler, and sampling apparatus are not shown in order to simplify the drawing.

In the foregoing drawing, details of the reactor and other matter have been simplified as one skilled in the art in possession of this disclosure having studied the same will recognize.

EXAMPLE

Nitrogen plasma was produced in a plasma reactor as described above by passing $N_2$ through an electric arc at 1.2 c.f.m. Fluoroform was charged into the reaction zone, a zone of nitrogen plasma downstream from the arc, through an injection port at the rate of 0.433 standard cubic feet per minute (5.06 lbs. per hour). The reaction products were then passed from the reaction zone to a condenser, a heat exchanger, a water bath, a bubbler, and on to a recovery system. Samples for analysis were taken from the stream through a filter and a $CaSO_4$ drier at a point downstream from the bubbler but upstream of the recovery system. The gross energy input was 17.7 kw./hr., and a net input of 10.0 kw./hr. was effected at 225 amps and 79 volts. Samples were collected and analyzed by gas-liquid chromatography and the effluent was determined to have the following composition:

| Component: | Mole percent |
|---|---|
| $CF_4$ (Tetrafluoromethane) | 57.7 |
| $C_2F_6$ (Hexafluoroethane) | 18.2 |
| $C_2F_4$ (Tetrafluoroethane) | 12.9 |
| $CF_3CN$ (Trifluoroacetonitrile) | 7.8 |
| $C_3F_6$ (Hexafluoropropene) | 3.4 |

These data clearly show that trifluoroacetonitrile is produced by the process of this invention and that valuable fluoroolefins are also produced as by-products.

Reasonable variation and modification are possible within the scope of this document which includes the invention, the essence of which is that fluoroform is converted under pyrolysis conditions in a plasma jet, for example in nitrogen plasma, to form trifluoroacetonitrile and other products.

I claim:

1. A process for the pyrolysis of fluoroform by contacting the same in a nitrogen plasma jet at a temperature in the approximate range 1000 to 20,000° F. for a contact time of 0.0001–10 seconds.

2. A process according to claim 1 wherein fluoroform is pyrolyzed in a nitrogen plasma to produce a reaction effluent containing the following: trifluoroacetonitrile, tetrafluoromethane, hexafluoroethane, tetrafluoroethene, and hexafluoropropene.

3. A process for the pyrolysis of fluoroform by contacting the same with a nitrogen plasma jet at a temperature to produce trifluoroacetonitrile within the approximate range 1000 to 20,000° F. for a contact time of 0.0001 to 10 seconds.

References Cited

UNITED STATES PATENTS 3,009,966   11/1961   Hauptschein et al.

JOSEPH P. BRUST, Primary Examiner

U.S. Cl. X.R.
260—653, 653.3